US009476787B1

(12) United States Patent
Westmoreland et al.

(10) Patent No.: US 9,476,787 B1
(45) Date of Patent: Oct. 25, 2016

(54) FLUID DETECTION SYSTEM FOR A PLURALITY OF TANKS

(71) Applicant: INNOVATIVE MEASUREMENT METHODS, INC., Sugar Land, TX (US)

(72) Inventors: Allen Ray Westmoreland, Sugar Land, TX (US); John Charles Hoben, Sugar Land, TX (US); Alexander Bukhman, Sugar Land, TX (US); Yosef Brodsky, Sugar Land, TX (US)

(73) Assignee: INNOVATIVE MEASUREMENT METHODS, INC., Sugar Land, TX (US)

( * ) Notice: Subject to any disclaimer, the term of this patent is extended or adjusted under 35 U.S.C. 154(b) by 0 days.

(21) Appl. No.: 15/041,875

(22) Filed: Feb. 11, 2016

(51) Int. Cl.
*G01L 19/00* (2006.01)
*G08B 21/18* (2006.01)
*G01N 25/00* (2006.01)
*G01L 19/12* (2006.01)
*G01M 3/32* (2006.01)

(52) U.S. Cl.
CPC ........... *G01L 19/0092* (2013.01); *G01L 19/12* (2013.01); *G01M 3/32* (2013.01); *G01N 25/00* (2013.01); *G08B 21/182* (2013.01)

(58) Field of Classification Search
None
See application file for complete search history.

(56) References Cited

U.S. PATENT DOCUMENTS

| | | | | |
|---|---|---|---|---|
| 4,855,714 A | * | 8/1989 | Clarkson | G08B 19/00 340/521 |
| 2003/0029236 A1 | * | 2/2003 | Morgan | G01F 22/00 73/149 |

* cited by examiner

*Primary Examiner* — Aditya Bhat
(74) *Attorney, Agent, or Firm* — Buskop Law Group, PC; Wendy Buskop

(57) ABSTRACT

A system for continuous measurement of multiple fluids in multiple tanks and computation of physical properties for each of the multiple fluids continuously. The system can use a plurality of probes, a plurality of client devices, a master control processor, and a master control data storage. The master control data storage can have computer instructions for receiving data from the plurality of probes, receiving data from other detection devices associated with the fluid in each tank, mapping collected data to a relational database, and comparing mapped data to stored values associated with prioritized alarm functions. The master control data storage can also have computer instructions for generating alarms to both a display connected with the master control processor and to the plurality of client devices using a network, generating reports associated with each generated alarm, generating an alarm log, and generating a history of actions taken by a user.

18 Claims, 11 Drawing Sheets

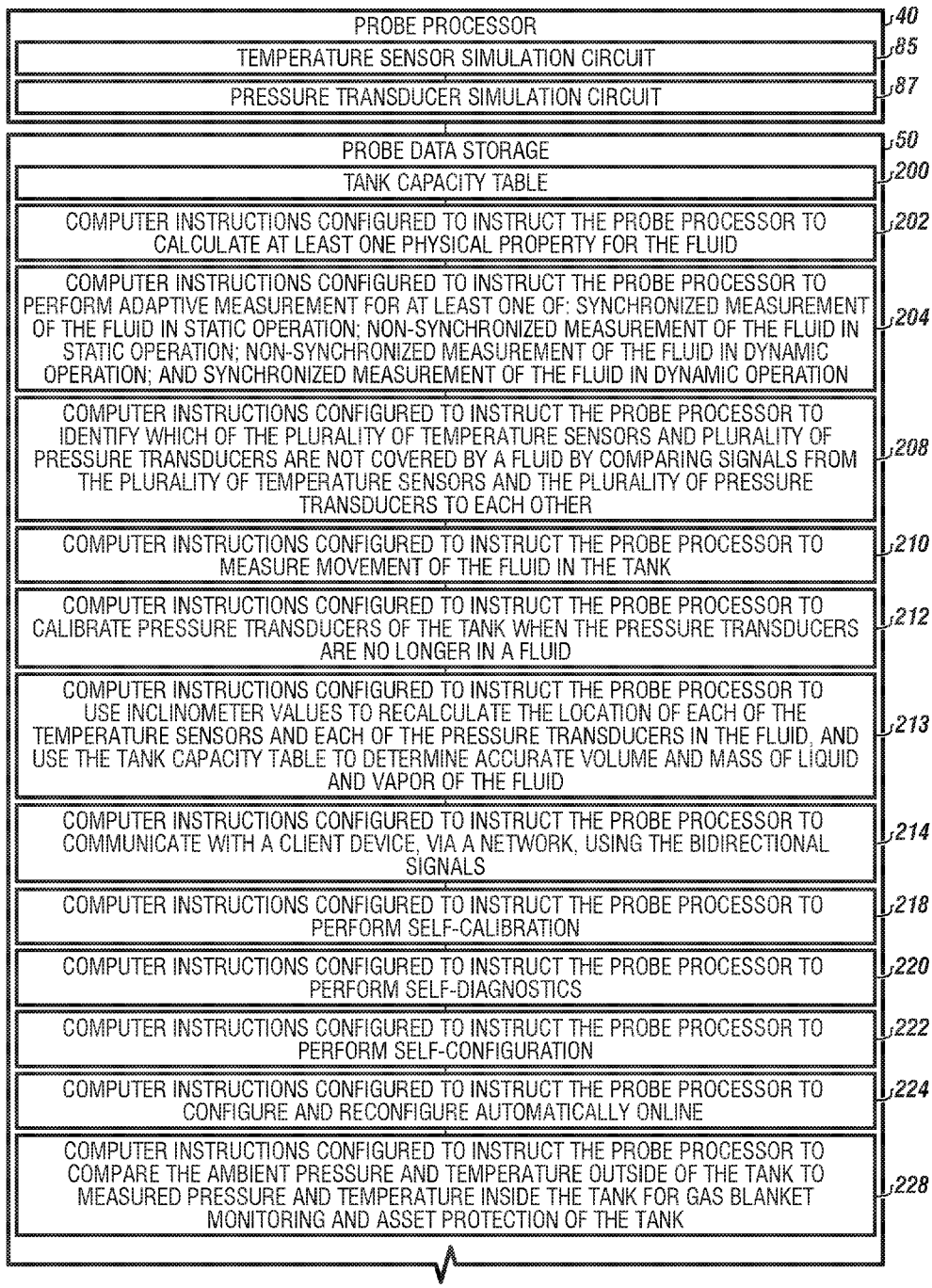

| | |
|---|---|
| COMPUTER INSTRUCTIONS CONFIGURED TO INSTRUCT THE PROBE PROCESSOR TO USE THE PLURALITY OF PRESSURE TRANSDUCERS AND THE PLURALITY OF TEMPERATURE SENSORS INTERNAL TO THE TANK, ANY TEMPERATURE AND PRESSURE TRANSDUCER LOCATED IN A VAPOR SPACE OF THE TANK, AND AN EXTERNAL SENSOR TO CALCULATE PARAMETERS NECESSARY FOR EMISSIONS MONITORING | 230 |
| COMPUTER INSTRUCTIONS CONFIGURED TO INSTRUCT THE PROBE PROCESSOR TO USE THE PLURALITY OF TEMPERATURE SENSORS AND THE PLURALITY OF PRESSURE TRANSDUCERS TO CALCULATE PARAMETERS NECESSARY FOR LEAK DETECTION AND UNAUTHORIZED MOVEMENT OF FLUID INTO AND OUT OF THE TANK | 232 |
| TEMPERATURE REFERENCE VALUE | 234 |
| PRESSURE REFERENCE VALUE | 235 |
| COMPUTER INSTRUCTIONS CONFIGURED TO INSTRUCT THE PROBE PROCESSOR TO COMPUTE SULFUR CONTAINING COMPOUND CONCENTRATION FOR PROTECTION OF PERSONNEL OR FOR ESTIMATION OF QUALITY OF CRUDE OIL | 236 |
| MASS OF THE FLUID | 303 |
| VOLUME OF THE FLUID | 304 |
| DENSITY STRATA OF THE FLUID | 306 |
| AVERAGE DENSITY OF THE FLUID | 308 |
| LEVEL OF THE FLUID | 310 |
| FLUID TEMPERATURE | 311 |
| FLUID FLOW RATE | 312 |
| FLUID PRESSURE | 313 |
| AMOUNT OF IMPURITY IN THE FLUID | 314 |
| ENTRAINED WATER CONTENT IN THE FLUID | 316 |
| FREE WATER CONTENT IN THE FLUID | 318 |
| COMPUTER INSTRUCTIONS CONFIGURED TO INSTRUCT THE PROBE PROCESSOR TO USE A COMPUTED MASS OF THE FLUID FOR BALANCING DURING LOADING AND UNLOADING OF A FLOATING VESSEL, AND FOR INVENTORY CONTROL AND CUSTODY TRANSFER | 322 |
| COMPUTER INSTRUCTIONS CONFIGURED TO INSTRUCT THE PROBE PROCESSOR TO CREATE BIDIRECTIONAL SIGNALS AND COMMUNICATE WITH THE MASTER CONTROL PROCESSOR USING THE NETWORK AND WHEREIN AT LEAST ONE OF THE MASTER CONTROL PROCESSOR, THE PROBE PROCESSOR OR THE REMOTE PROCESSOR USE THE INCLINOMETER VALUES TO RECALCULATE THE LOCATION OF EACH OF THE TEMPERATURE SENSORS AND EACH OF THE PRESSURE TRANSDUCERS IN THE FLUID, AND USE THE TANK CAPACITY TABLE TO DETERMINE AT LEAST ONE VOLUME, LEVEL, AND MASS OF THE FLUID | 324 |

| REMOTE DATA STORAGE | 73 |
|---|---|
| COMPUTER INSTRUCTIONS CONFIGURED TO INSTRUCT THE REMOTE PROCESSOR TO CALCULATE SNOW OR WATER ACCUMULATION ON A ROOF OF THE TANK USING BIDIRECTIONAL SIGNALS FROM THE PROBE PROCESSOR | 225 |
| COMPUTER INSTRUCTIONS CONFIGURED TO INSTRUCT THE REMOTE PROCESSOR TO COLLECT DATA FROM MULTIPLE PROBES AND CONCENTRATE THE DATA FOR COMMUNICATION TO A MASTER CONTROL PROCESSOR | 227 |
| COMPUTER INSTRUCTIONS CONFIGURED TO INSTRUCT THE REMOTE PROCESSOR TO CALCULATE PARAMETERS NECESSARY FOR EMISSION MONITORING | 431 |
| COMPUTER INSTRUCTIONS CONFIGURED TO INSTRUCT THE REMOTE PROCESSOR TO CALCULATE PARAMETERS NECESSARY FOR LEAK DETECTION AND UNAUTHORIZED MOVEMENT OF FLUID INTO OR OUT OF THE TANK | 433 |
| COMPUTER INSTRUCTIONS CONFIGURED TO INSTRUCT THE REMOTE PROCESSOR TO CALCULATE PARAMETERS NECESSARY FOR OVERFILL PROTECTION OF THE TANK | 435 |
| COMPUTER INSTRUCTIONS CONFIGURED TO INSTRUCT THE REMOTE PROCESSOR TO CALCULATE TANK OVERPRESSURE OR VACUUM PARAMETERS IN THE TANK | 437 |

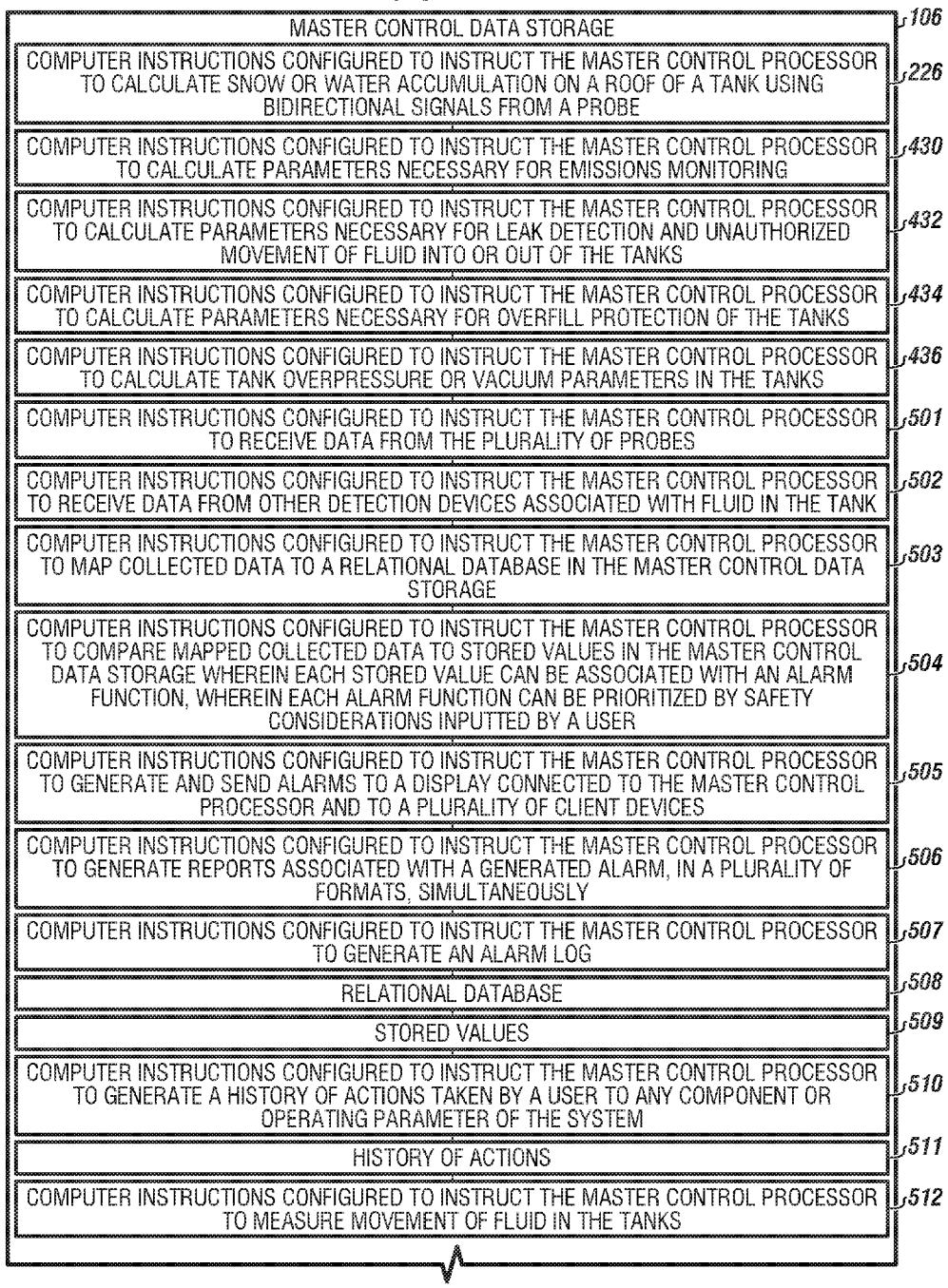

COMPUTER INSTRUCTIONS CONFIGURED TO INSTRUCT AT LEAST ONE OF THE MASTER CONTROL PROCESSOR AND A REMOTE PROCESSOR TO PROVIDE REPORTS IN VARIOUS FORMATS INCLUDING GRAPHICAL OR TEXT SCREEN REPORTS, PRINTED REPORTS, FILE FORMAT FOR TRANSFER OR STORAGE REPORTS, OR HTML FORMATTED REPORTS THAT CAN BE READ BY ANY BROWSER OF A GLOBAL COMMUNICATION NETWORK

*FIGURE 7C*

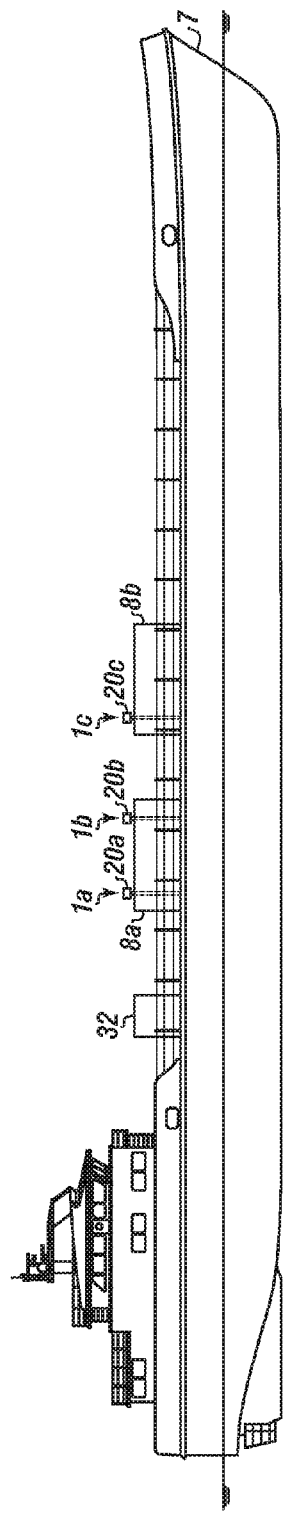

FLUID DETECTION SYSTEM FOR A PLURALITY OF TANKS

FIELD

The present embodiments generally relate to a system for measuring fluids in one or more tanks which can be either on land or on a marine floating vessel.

BACKGROUND

A need exists for a system that provides highly sensitive and accurate leak detection and emissions monitoring for use in a plurality of tanks using probes with no moving parts. A further need exists for a system that incorporates sensing devices with synchronized measurements for increased accuracy in measurements and accommodates motion of the tank based on pitch, heave and yaw motions.

The present embodiments meet these needs.

BRIEF DESCRIPTION OF THE DRAWINGS

The detailed description will be better understood in conjunction with the accompanying drawings as follows:

FIGS. 5A and 5B depict a probe processor and a probe data storage according to one or more embodiments.

FIG. 6 depicts a remote data storage usable in the system according to one or more embodiments.

FIGS. 7A-7C depict a master control data storage usable with the system according to one or more embodiments.

FIG. 8 shows the system with a plurality of tanks and a plurality of electronically connected probes on a floating vessel according to one or more embodiments.

Figure 1:
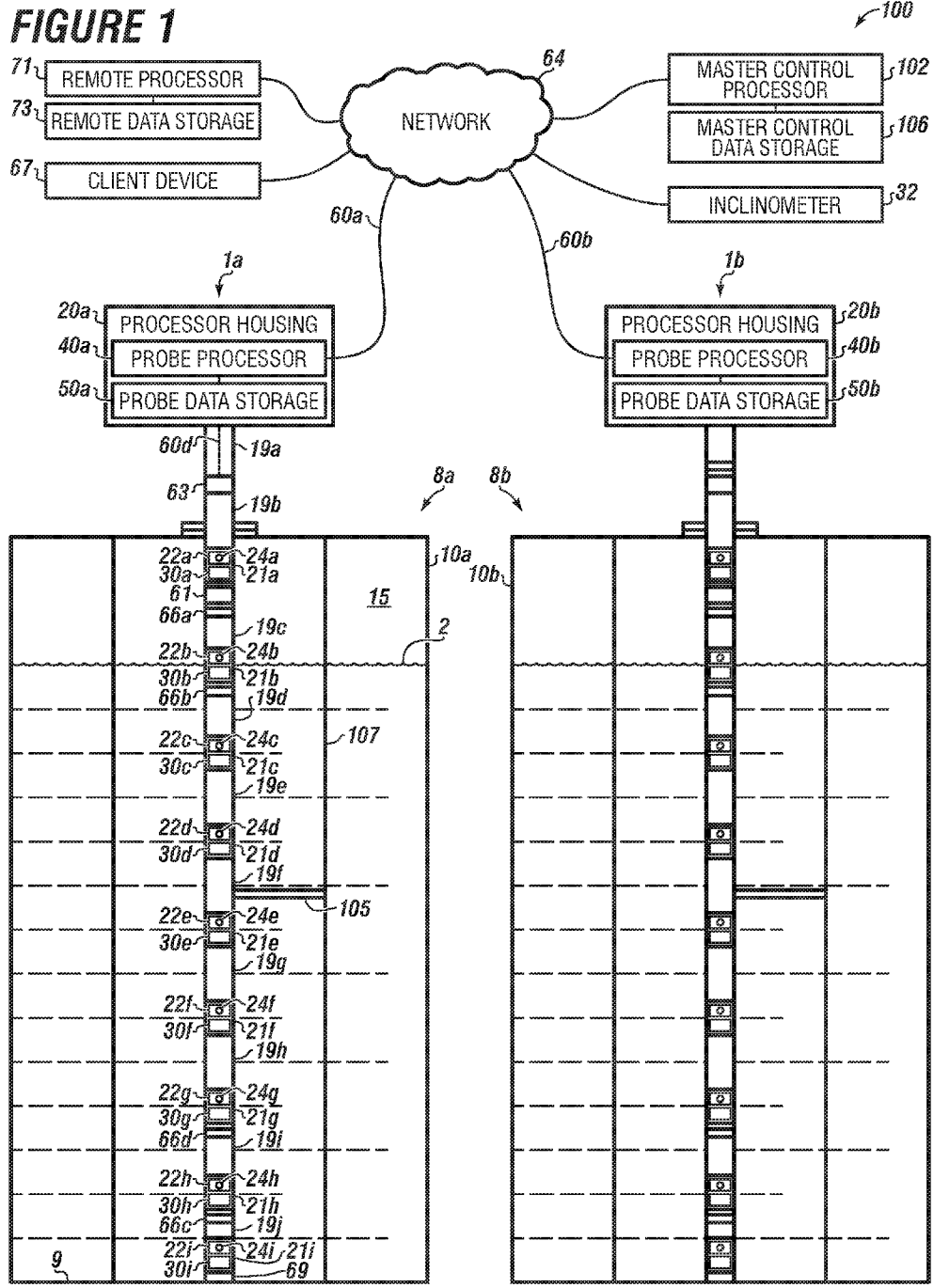
FIG. 1 shows a detail of the system according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments generally relate to a system for measuring fluids in one or more tanks, which can be either on land or on a marine floating vessel.

The system can be for continuous measurement of multiple fluids in multiple tanks using multiple probes mounted in each tank connected to a network.

The master control processor can communicate with a plurality of client devices.

The master control processor can use computer instructions for computation of physical properties for each of the multiple fluids continuously and can transmit the information to the plurality of client devices.

The master control processor can use computer instructions to receive data from the plurality of probes and data from other detection devices associated with fluid in the tank.

The master control processor can then map collected data to a relational database in the master control data storage.

The master control processor can compare mapped collected data to stored values associated with a prioritized alarm functions and can generate alarms to a display connected with the master control processor and to the plurality of client devices.

The master control processor can generate reports associated with each generated alarm.

The master control processor can also generate an alarm log and a history of actions taken by a user to any component or operating parameter of the system.

The system can have the benefit of monitoring quantity and quality parameters of fluids in tanks, optional leak detection and unauthorized movement detection, monitoring emissions parameters, monitoring gas blanketing for asset protection and operational control, mass balance for gain and loss calculations and for floating vessel balance, and reporting notifications to a client device or network when any of the parameters are not within preset values or do not comply with environmental laws and regulations.

The present embodiments can be for a system using multiple probes.

Each probe can utilize multiple temperature sensors and multiple pressure transducers for performing hydrostatic tanks measurements and can provide increased accuracy and consistency with regard to measurement values.

Specific structural and functional details disclosed herein are not to be interpreted as limiting, but merely as a basis of the claims and as a representative basis for teaching persons having ordinary skill in the art to variously employ the present embodiments.

The term "continuous" as used herein can refer to measurements and computations that can be performed repeatedly in a time frame of less than 10 minutes.

The term "fluid" as used herein can include liquids, gasses with or without particulates, and combinations thereof. Vapor pressure can be used in the conventional manner and can be included within the scope of the term "gas" for this application. Fluids can include hydrocarbons, water, wine, beer, gasoline, oil, pharmaceuticals, alcohols, esters, inert gasses and vapors.

The term "fluid temperature" as used herein can refer to an average fluid temperature or a multipoint spot temperature of the fluid.

The term "inclinometer" as used herein can refer to an instrument for measuring angles of a floating object with respect to gravity. The inclinometer can measure after draft, forward draft, list, trim and pitch and roll.

The term "master control processor" as used herein can refer to a processor, such as one or more computers connected together which are either adjacent the probes or remote to the probes, for performing certain processing steps of the system. Processing steps of the system can include parallel calculating for multiple tanks or physical properties of the fluids, while comparing measured values to stored values and generating alarms via a network to a plurality of client devices. Optionally, a remote processor can expedite action to prevent the harm.

The term "mapping collected data" as used herein can refer to the step of placing collected data into the relational database and into known registers.

The term "network" as used herein can refer to a global communication network such as the Internet, a local area network, a radio network, a hard wired network, a copper wire network, a cellular network, a satellite network, a fiber optic network, an infrared connection, a plain old telephone system (POTS), other wireless or wired networks, and combinations thereof.

The term "pressure transducer" as used herein can refer to a device that can measure pressure of the fluid.

The term "processor" as used herein can refer to a laptop, a cellular phone or a smart phone, a desktop computer, a server on a network, another measuring device that does different measuring and that can connect to the plurality of temperature sensors and plurality of pressure transducers. The processor can be in wired or wireless communication with the temperature sensors and the pressure transducers.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "temperature sensor" as used herein can refer to either one temperature sensor or a pair of temperature sensors for detecting a temperature of the fluid in the tank.

The term "tanks" as used herein can refer to a wide variety of tanks and containers that can hold fluids. For example, tanks can include a first tank containing ten barrels of oil and a second tank containing 1,000,000 barrels of oil. The tanks can be structured with or without floating roofs. The tanks can be any shape. Tanks of any volume can be made from various materials.

The system can provide the benefit of continuous measurements, simultaneous with continuous comparison of measured values with preset limits, such as environmental standards.

The system can be expected to provide enhanced accuracy and consistent measurements for tank farms and multiple tanks by at least 15 percent as compared to existing detection and monitoring apparatus.

The system can provide multiple alarms to multiple client devices using a network and a predefined priority grouping system when measured values exceed or fall below preset limits.

The system can use a master control processor and probe processors that can identify many physical characteristics of fluids, which can be measured using the probes with multiple temperature sensors and the pressure transducers for the gas or liquid, with or without particulate matter.

Use of the system can prevent hazardous environmental emissions and can avoid other potentially dangerous or detrimental fluid conditions through continuous monitoring.

Use of the system on multiple tanks can prevent death of workers near the tanks due to inhalation of harmful emissions.

The system can allow remediation to be taken from 2 minutes to 48 hours when fluid conditions reach unacceptable levels, thereby preventing environmental contamination, explosions, loss of fluid, death and damage to equipment. Unacceptable levels can be extreme pressure and temperatures, the formation of vacuums, and the emissions of harmful amounts of hydrocarbons and other potentially harmful chemicals.

For example, the system can perform analysis of the measured values for tanks, which can form a calculated value for a fluid in each tank, such as a mass of the fluid. A mass of the fluid in one tank can be a few tons while it can be hundreds or thousands of tons of crude oil in another tank.

A calculated value can also be a fluid volume in the plurality of tanks, which can range from tens of barrels to millions of barrels of liquid petroleum gas.

The system can perform analysis of fluid density for the fluid in each tank of the plurality of tanks. The fluid density can range from 0.5 grams/cc in a first tank and up to 2 grams/cc or more for a petroleum product in a second tank.

In an embodiment of the system, each probe can have a plurality of temperature sensors and a plurality of pressure transducers connected to a probe processor that can communicate with the master control processor.

Each probe can have one or more of the pressure transducers, which can include a diaphragm. The diaphragm can be oriented horizontal to the bottom of the tanks but can be at other orientations.

For monitoring and alarming of multiple tanks from multiple locations, the master control processor can be a computer, a laptop, a dedicated client device with a built in processor, such as a cellular phone or a smart phone, a processor which can be part of a cloud computing system or connected to a network, and combinations thereof.

An embodiment of the system can use wireless communication between the probe processor and the master control. An embodiment of the system can use wireless or wired communication between the probe processor and the plurality of temperature sensors and the plurality of pressure transducers.

In embodiments, the master control processor and the probe processors can communicate to a remote processor via a network such as the Internet or another global communication network. The remote processor can receive data from many probe processors from many tanks to create a plurality of virtual gauges for comparative purposes for an entire tanks farm or a fleet of tanks.

The master control processor or a remote processor can instruct each probe processor to synchronously poll measurement data from the one or more temperature sensors and one or more pressure transducers continuously and calculate values, forming calculated values which can then be transmitted to the master control processor.

The master control processor or the remote processor can instruct probe processors to convert pressure and temperature sensor data to one or more values for monitoring fluid flow using computer instructions in the probe data storage or in the master control data storage. The values can provide a reading or notification of a measurement or calculation on fluid flow pertaining to the contained fluid for leak detection and related measurement including unauthorized movement of fluid from the tanks. Unauthorized movement of fluid can include theft of fluid, leaking of fluid that affects the volume of fluid in the tank, incorrect lineup of pipes or conduits into or out of the tank.

The data from the temperature sensors and the pressure transducers can be compared in order to obtain a better real-time picture of the entire tank farm and to provide a higher accuracy of readings and measurements for the contained fluids.

The master control processor can use the calculated values to compare the calculated values to one or more predetermined ranges of values for the fluid in each of the plurality of tanks to identify whether the calculated values are within the predetermined ranges. For example, a density of a specific crude oil can have a predetermined range from 0.85 to 1.0 grams/cc, and the present system can constantly collect data and compare the collected data to that predetermined range. Notifications can be provided if the calculated values exceed a predetermined range.

The master control processor can use computer instructions in the master control data storage with a plurality of stored automated responses, such as alarms, when the calculated values exceed a predetermined range.

The calculated values can specifically be values for a mass of the fluid, a fluid volume, an average temperature of the fluid, a multiple density strata of the fluid, an average density of the fluid, a level of the fluid, a fluid flow rate, an impurity content of the fluid, an entrained water content of the fluid, a free water content of the fluid, or combinations thereof.

An embodiment of the system can monitor and compare measurements for atmospheric or ambient pressures and temperatures to measurements for vapor pressures and vapor temperatures to provide data with notifications and/or alarms.

Examples of the type of data to be compared can include extreme pressures, extreme temperatures, formation of vacuums, high amounts of hydrocarbon emissions or other harmful chemical emissions, or combinations thereof. Immediate notifications and alarms can be produced to provide an alert of potentially harmful gasses, liquids, and vapors that are escaping into the atmosphere and surrounding area.

The master control processor can store measured values, calculated values, and stored alarms. The master control processor can also store priority groupings of client devices to receive alarms in one or more data storage media in communication with the processor. Data storage media can include remote data storage media, removable data storage media, and fixed data storage media.

The master control or remote processor can also be configured to communicate with one or more of the following: (1) a remote terminal unit, such as a Bristol Babcock RTU for tubular line monitoring, (2) a distributive control system, such as, a Honeywell DSC 3000, (3) a supervised control and data acquisition (SCADA) system, such as a Human Machine Interface system, (4) another computer, (5) another tank or vessel gauge interface unit, such as a 1515 ETGI provided by Gauging Systems, Inc. of Houston, Tex., and other similar devices to collect additional data needed for providing alarms and monitoring emissions.

In embodiments, temperature sensors and pressure transducers can each include a transmitter, such as a radio transceiver, a satellite transmitter, a cellular transceiver, an RS-485 wired transmitter, or other similar transmitters. The transmitter can communicate between the temperature sensors, the pressure transducers, and the remote processor. The communication can be a wireless communication, a fiber optic communication, a cabled communication, or combinations thereof.

A transmitter can be disposed in proximity to one or more tanks for transmitting data from the one or more tanks to a remote processor.

In embodiments, each probe can contain one or more sensor housings which can be made from any durable material, including machined stainless steel, plastic, a metal alloy, such as HASTELLOY-C™, Teflon™, aluminum, KYNAR™ composites, ceramic composites, and formed polymer blends, such as PVC.

In embodiments, the sensor housing can include one or more channels. The channels can contain signaling wires to convey temperature sensor data to the probe processor.

The channels can be smooth walled. The signaling wires can be multi-conductor wire, such as wire available from Belden, other types of wire, or similar communication wiring, such as fiber optic wiring or cable.

Turning now to the Figures, FIG. 1 shows a detail of the system according to one or more embodiments.

The system 100 is shown with two probes 1*a* and 1*b* connected to a network 64. In embodiments at least one probe can be used in the system. In other embodiments, a plurality of probes can be used in the system.

An inclinometer 32 can be in communication with the network 64, each probe 1*a* and 1*b*, and a master control processor 102.

A remote processor 71 can be connected to the network 64. The remote processor can be in communication with a remote data storage 73, which can also provide information to the master control processor and at least one of the probes 1*a* and 1*b*.

At least one client device 67 can be connected to the network 64 for bidirectionally receiving and transmitting information from the master control processor 102, the remote processor 71, and probe processors 40*a* and 40*b* as needed.

The probes 1*a* and 1*b* can communicate to the network 64 using bidirectional signals 60*a* and 60*b*.

The inclinometer 32 can measure angles of the floating vessel relative to gravity.

The probes 1*a* and 1*b* can each have a processor housing 20*a* and 20*b* configured to prevent degradation in marine environments, such as salt water. The processor housings can be mounted outside of the tanks 8*a* and 8*b*.

Each tank in which each probe is mounted can have a floor 9 and at least one wall 10*a* and 10*b*. The at least one wall 10*a* and 10*b* are shown as cylindrical.

The probes 1*a* and 1*b* can be configured for continuous measurement of a fluid 2 while immersed in that fluid. The fluid can be a combination of liquid and vapor. The tanks 8*a* and 8*b* can each have a vapor space 15 above the fluid in the tanks.

The probes 1*a* and 1*b* can each have a plurality of pressure transducers 22*a*-22*i*, wherein each pressure transducer can have a diaphragm 24*a*-24*i*.

Each pressure transducer can be configured for continuous pressure measurement through direct contact with the fluid 2 in the tanks.

The probes 1*a* and 1*b* can each have a plurality of temperature sensors 30*a*-30*i*, wherein each of the temperature sensors can be contained in either one of the pressure transducers or in one of the sensor housings.

Each temperature sensor can be configured for continuous temperature measurement of the fluid 2 in the tanks.

The probe processors 40*a* and 40*b* can be disposed in the processor housings 20*a* and 20*b*.

Each probe processor can be electrically connected to the plurality of pressure transducers and to the plurality of temperature sensors in a tank. Each probe processor can electronically connect to the network 64 with bidirectional signals 60*a*-60*d*.

Each processor housing 20*a* and 20*b* can have a probe data storage 50*a* and 50*b*, wherein each of the probe data storages can be in bidirectional communication with its respective probe processor.

Each of the probe data storage 50*a* and 50*b* can be a computer readable media with computer instructions for instructing the probe processor to control the plurality of temperature sensors and the plurality of pressure transducers electrically connected to it, and to produce bi-directional signals to the network, the plurality of temperature sensors, and the plurality of pressure transducers.

A temperature and pressure transducer 61 can be located in the vapor space 15 of the tank. In embodiments, more than one temperature and pressure transducer can be used in each tank.

A plurality of conduits 19a-19g can be used for connecting the processor housing 20a with sensor housings 21a-21g.

The plurality of conduits 19a-19g can extend to a bottom of the probe 1a. In embodiments, the bottom of each probe can be proximate to or within inches, such as 1 inch to 30 inches from the floor 9 of the tank.

A plurality of switches 66a-66d can be disposed in the tank 8a. Each switch can detect liquid levels, compare detected liquid levels to a preset level stored in the switch and then provide a notification signal to the at least one client device 67 via the network, or a notification to the probe processor 40a, the master control processor 102, or to all processors and the at least one client device, when liquid exceeds or fails to meet the preset level of the switch.

An external sensor 63 can be located outside of the tank 8a. The external sensor can be electrically connected to the probe processor 40a.

The external sensor 63 can be configured to measure ambient pressure and ambient temperature outside the tank 8a. The external sensor 63 can provide signals.

The probe processor 40a can use computer instructions to compare the ambient pressure and temperature measured outside the tank by the external sensor to measured pressure and temperature inside the tank measured by the plurality of pressure transducers and the plurality of temperature sensors for gas blanket monitoring and asset protection of the tank.

In embodiments, a plurality of probes can communicate using the bidirectional signals with the network 64. The bidirectional signals can transmit to the at least one client device 67. Commands and data from the at least one client device 67 can be transmitted via the network 64 to the probe processors 40a and 40b.

In embodiments, the plurality of transducers, the plurality of temperature sensors, the plurality of conduits, the plurality of switches, the diaphragms and the sensor housings can be contained in an in tank housing 107 of the probe.

In embodiments, a spacer 105 can be used to keep the plurality of transducers, the plurality of temperature sensors space apart from the in tank housing 107. In embodiments, a plurality of spacers can be used.

In embodiments, the spacer can help stabilize the probe and prevent the marine vessel, if used, from listing.

At least one sulfur containing compound detector 69 can be used in each of the tanks.

The sulfur containing compound detector 69 can be in communication with the probe processor 40a for detecting sulfur containing compound. The probe processor 40a can use computer instructions in the probe data storage configured to instruct the probe processor to compute sulfur containing compound concentration for protection of personnel or for estimation of quality of crude oil.

Figure 2:
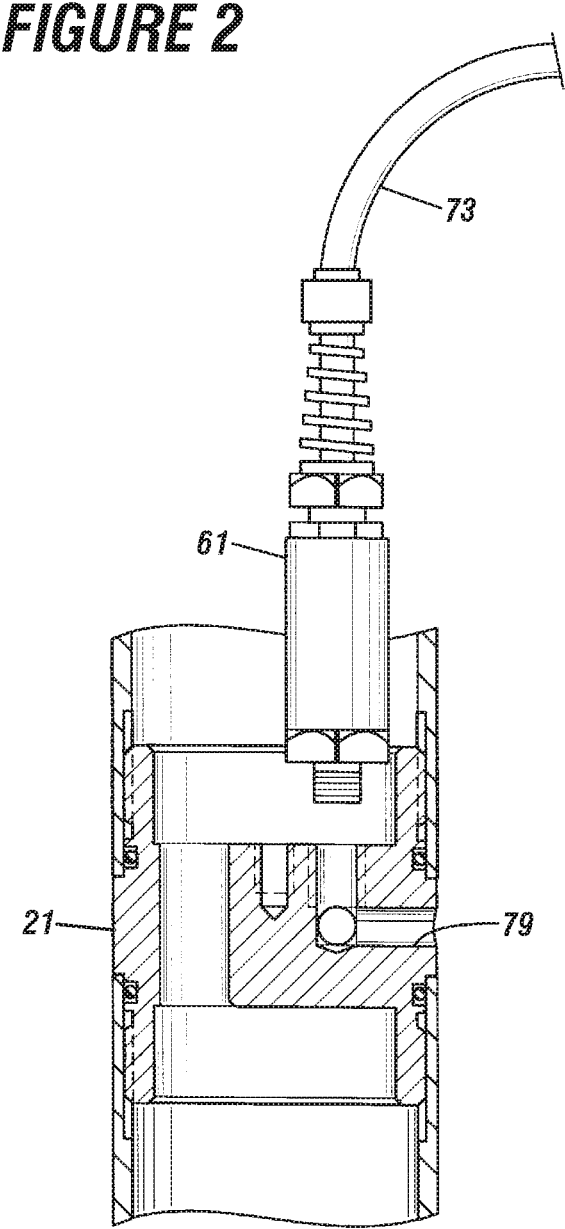
FIG. 2 shows a partial cross section view of a sensor housing usable with the system according to one or more embodiments.

FIG. 2 shows a partial cross section view of a sensor housing usable with the system according to one or more embodiments.

Output leads 73 can be shown from the temperature and pressure transducer 61. The temperature and pressure transducer 61 can be disposed partially in the sensor housing 21. In embodiments, to operate the temperature and pressure transducer 61, a portion of the temperature and pressure transducer can be external of the sensor housing.

A channel 79 can be formed in the sensor housing 21. The channel 79 can have a plurality of inclined surfaces that can enable fluid from the tank to contact with the temperature and pressure transducer 61.

Figure 3:
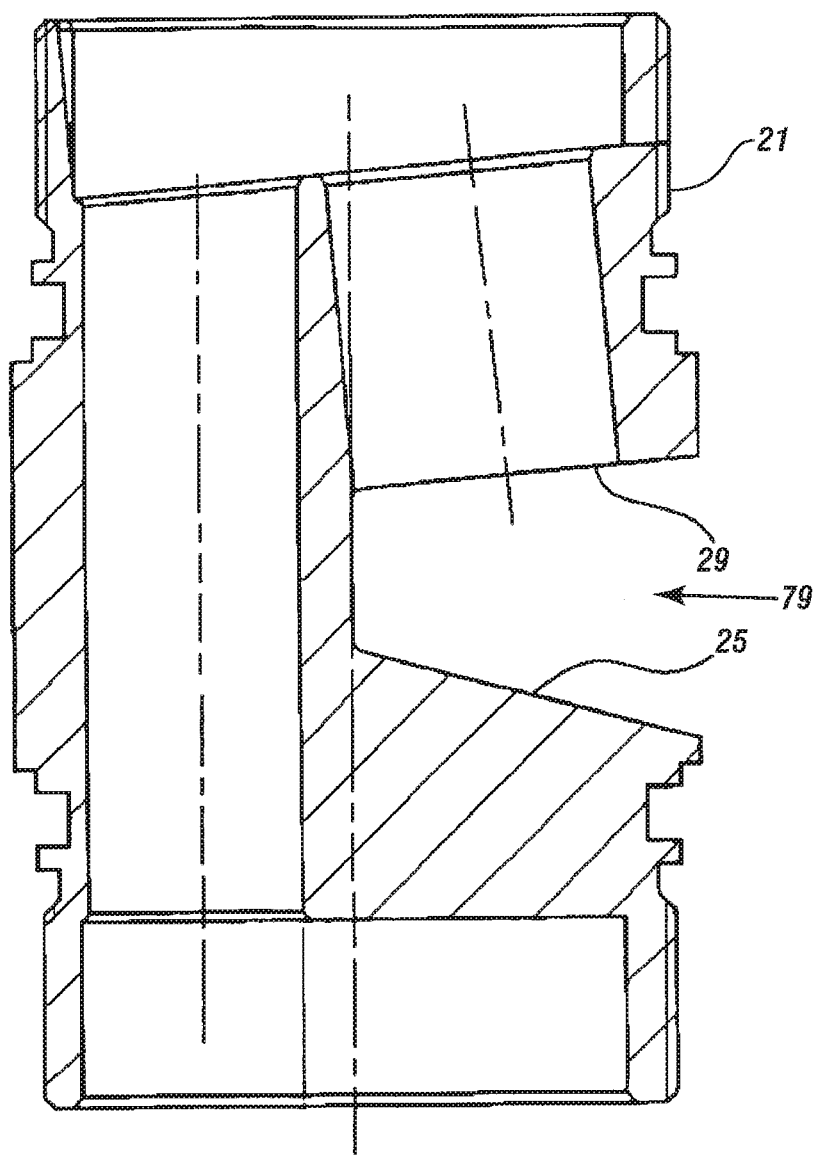
FIG. 3 is a detailed view of a channel of a sensor housing usable with the system according to one or more embodiments.

FIG. 3 is a detailed view of a channel of a sensor housing usable with the system according to one or more embodiments.

The channel 79 is shown in the sensor housing 21 of the marine probe. In this embodiment, the marine probe can have two inclined surfaces in the sensor housing, shown here as a first surface 25 and a second surface 29, which can form the channel 79. Each inclined surface can have a slope from 2 degrees to 50 degrees.

In embodiments, a plurality of inclined surfaces can be used on one side of the channel 79. The channel 79 can enable fluid from the tank to contact a pressure transducer or a temperature sensor in the sensor housing or a combination pressure and sensor transducer in the sensor housing.

In embodiments, just one inclined surface can be formed on a side of channel 79.

Figure 4:
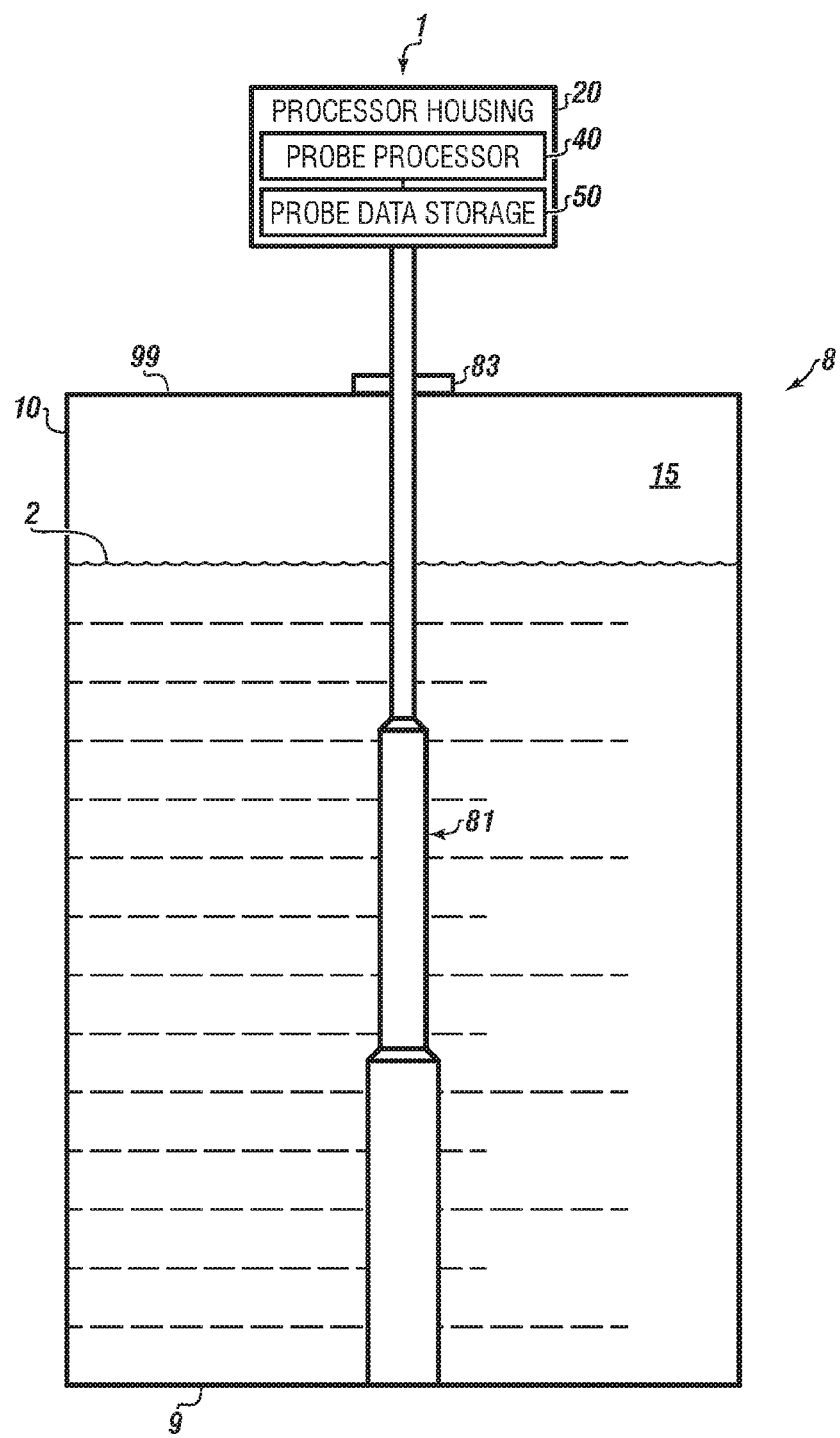
FIG. 4 shows a probe usable with the system with an outer surface in a stepped configuration according to one or more embodiments.

FIG. 4 shows a probe usable with the system with an outer surface in a stepped configuration according to one or more embodiments.

The probe 1 is shown with an outer surface 81 formed in a sequential stepped configuration as three segments, wherein each segment expands at least 10 percent in diameter sequentially from an adjacent segment.

The probe 1 can have a tank movement measuring device 83 connected to a roof 99 of the tank 8 with the fluid 2 and the vapor space 15. The tank 8 can have at least one wall 10, shown here as a cylindrical tank, and a floor 9. The tank movement measuring device 83 can be mounted external of the tank 8.

The tank movement measuring device 83 can be electronically connected to the probe processor 40 in the processor housing 20 or the remote processor via the network. The tank movement measuring device can provide signals that can be stored in the remote processor data storage. The tank movement measuring device 83 can communicate with the probe processor 40 or a display for an operator. The tank movement measuring device can measure and display movement due to flexing of the floor 9 of the tank 8 or due to flexing of the roof 99 of the tank 8. The display can be a local display, a remote display, or combinations thereof.

The tank movement measuring device 83 can measure when the probe has moved due to the flexing of the floor 9 of the tank 8 with the fluid 2 or flexing of the roof 99 of the tank with the vapor space 15 relative to the floor 9. The tank movement measuring device can transmit those measurements to the probe data storage 50 either wirelessly or in a wired communication for further notification to the display associated with the probe processor 40 or the remote processor via the network or the client device via the network.

FIGS. 5A and 5B depict a probe processor and a probe data storage according to one or more embodiments.

In embodiments, the probe processor 40 can have a temperature sensor simulation circuit 85 and a pressure transducer simulation circuit 87.

The probe data storage 50 can be connected to the probe processor 40.

The temperature sensor simulation circuit 85 can be for automatically calibrating the probe processor and can use a temperature reference value 234 for calibration. The temperature reference value 234 can be shown in the probe data storage 50.

The pressure transducer simulation circuit 87 can be for automatically calibrating the probe processor. The pressure transducer simulation circuit can use a pressure reference value 235 for calibration. The pressure reference value 235 can be shown in the probe data storage 50.

The probe data storage 50 can contain a tank capacity table 200, which can show capacities and/or volumes in a tank for various fluid levels as measured from a reference gauge point.

The probe data storage can contain computer instructions 202 configured to instruct the probe processor to calculate at least one physical property for the fluid.

The physical properties can be stored in the probe data storage and can include but are not limited to: a mass of the fluid 303, a volume of the fluid 304, a density strata of the fluid 306, an average density of the fluid 308, a level of the fluid 310, a fluid temperature 311, a fluid flow rate 312, a fluid pressure 313, an amount of impurity in the fluid 314, an entrained water content in the fluid 316, and a free water content in the fluid 318.

The probe data storage can contain computer instructions 204 to instruct the probe processor to perform adaptive measurement for at least one of: synchronized measurement of the fluid in static operation, non-synchronized measurement of the fluid in static operation, non-synchronized measurement of the fluid in dynamic operation, and synchronized measurement of the fluid in dynamic operation.

The probe data storage can contain computer instructions 208 configured to instruct the probe processor to identify which of the plurality of temperature sensors and the plurality of pressure transducers are not covered by a fluid by comparing signals from the plurality of temperature sensors and the plurality of pressure transducers to each other.

The probe data storage can contain computer instructions 210 configured to instruct the probe processor to measure movement of the fluid in the tank.

The probe data storage can contain computer instructions 212 configured to instruct the probe processor to calibrate pressure transducers of the tank when the pressure transducers are no longer in the fluid.

The probe data storage can contain computer instructions 213 configured to instruct the probe processor to use inclinometer values to recalculate the location of each of the temperature sensors and each of pressure transducers in the fluid, and use the tank capacity table to determine accurate volume and mass of liquid and vapor of the fluid.

The probe data storage can contain computer instructions 214 configured to instruct the probe processor to communicate with a client device via a network by using the bidirectional signals.

The probe data storage can contain computer instructions 218 configured to instruct the probe processor to perform self-calibration.

The probe data storage can contain computer instructions 220 configured to instruct the probe processor to perform self-diagnostics.

The probe data storage can contain computer instructions 222 configured to instruct the probe processor to perform self-configuration.

In embodiments, the probe data storage can have at least one computer instruction configured to instruct the probe processor to preform self-calibration, perform self-diagnostics, perform self-configuration, or various combinations thereof.

The probe data storage can contain computer instructions 224 configured to instruct the probe processor to configure and reconfigure automatically online.

The probe data storage can contain computer instructions 228 configured to instruct the probe processor to compare the ambient pressure and temperature to measured pressure and temperature inside the tank for gas blanket monitoring and asset protection of the tank.

The probe data storage can contain computer instructions 230 configured to instruct the probe processor to use the plurality of pressure transducers and temperature sensors internal to the tank, any temperature and pressure transducer located in a vapor space of the tank and the external sensor to calculate parameters necessary for emissions monitoring.

The probe data storage can contain computer instructions 232 configured to instruct the probe processor to use the plurality of temperature sensors and/or the plurality of pressure transducers to calculate parameters necessary for leak detection and unauthorized movement of fluid into and out of the tank.

The temperature sensor simulation circuit's temperature reference value 234 and the pressure transducer simulation circuit's pressure reference value 235 are shown in the probe data storage 50.

The probe data storage can contain computer instructions 236 configured to instruct the probe processor to compute sulfur containing compound concentration for protection of personnel or for estimation of quality of crude oil as mentioned earlier.

The probe data storage can contain computer instructions 322 configured for instruct the probe processor to use a computed mass of the fluid for balancing during loading and unloading of the floating vessel and for inventory control and custody transfer The probe data storage can contain computer instructions 324 configured to instruct the probe processor to create bidirectional signals and communicate with the master control processor using the network and wherein at least one of the master processor, the probe processor, or the remote processor use the inclinometer values to recalculate the location of each of the temperature sensors and each of the pressure transduces in the fluid and use the tank capacity table to determine at least one volume, level, and mass of the fluid.

FIG. 6 depicts a remote data storage usable with the system according to one or more embodiments.

In embodiments, the remote data storage 73 can communicate with the remote data processor for communication with the master control processor and the probe processor via the network.

The remote data storage 73 can include computer instructions 225 configured to instruct the remote processor to calculate snow or water accumulation on a roof of the tank using bidirectional signals from the probe processor.

The remote data storage 73 can include computer instructions 227 configured to instruct the remote processor to collect data from multiple probes and concentrate the data for communication to a master control processor.

The remote data storage 73 can include computer instructions 431 configured to instruct the remote processor to calculate parameters necessary for emission monitoring.

The remote data storage 73 can include computer instructions 433 configured to instruct the remote processor to calculate parameters necessary for leak detection and unauthorized movement of fluid into or out of the tank.

The remote data storage 73 can include computer instructions 435 configured to instruct the remote processor to calculate parameters necessary for overfill protection of the tank.

The remote data storage 73 can include computer instructions 437 configured to instruct the remote processor to calculate tanks overpressure or vacuum parameters in the tank.

Figure 7B:
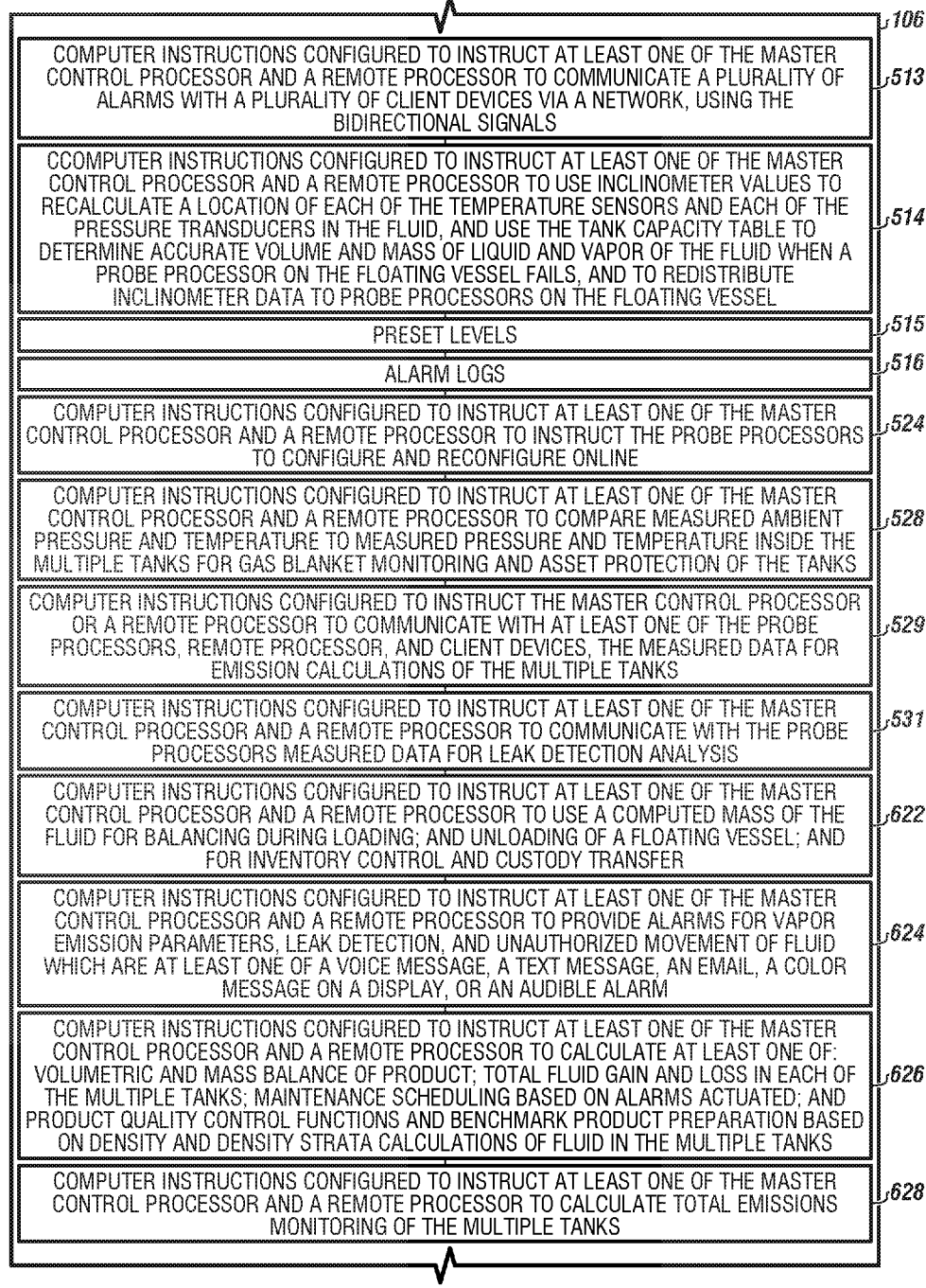

FIGS. 7A, 7B and 7C depict the master control data storage usable with the system according to one or more embodiments.

The master control data storage 106 can include computer instructions 226 configured to instruct the master control processor to calculate snow or water accumulation on a roof of a tank using bidirectional signals from a probe.

The master control data storage 106 can include computer instructions 430 configured to instruct the master control processor to calculate parameters necessary for emissions monitoring.

The master control data storage 106 can include computer instructions 432 configured to instruct the master control processor to calculate parameters necessary for leak detection and unauthorized movement of fluid into or out of the tanks.

The master control data storage 106 can include computer instructions 434 configured to instruct the master control processor to calculate parameters necessary for overfill protection of the tanks.

The master control data storage 106 can include computer instructions 436 configured to instruct the master control processor to calculate tank overpressure or vacuum parameters in the tanks.

The master control data storage 106 can include computer instructions 501 configured to instruct the master control processor to receive data from the plurality of probes.

The master control data storage 106 can include computer instructions 502 configured to instruct the master control processor to receive data from other detection devices associated with fluid in the tank.

The master control data storage 106 can include computer instructions 503 configured to instruct the master control processor to map collected data to a relational database in the master control data storage.

The master control data storage 106 can include computer instructions 504 configured to instruct the master control processor to compare mapped collected data to stored values in the master control data storage, wherein each stored value can be associated with an alarm function, and wherein each alarm function can be prioritized by safety considerations inputted by a user.

The master control data storage 106 can include computer instructions 505 configured to instruct the master control processor to generate and send alarms to a display connected with the master control processor and to a plurality of client devices.

The master control data storage can contain computer instructions 506 configured to instruct the master control processor to generate reports associated with a generated alarm in a plurality of formats, simultaneously.

The master control data storage can contain computer instructions 507 configured to instruct the master control processor to generate an alarm log.

The master control database 106 can include a relational database 508 and stored values 509.

The master control data storage can contain computer instructions 510 configured to instruct the master control processor to generate a history of actions taken by a user to any component or operating parameter of the system.

The master control data storage can contain the history of actions 511.

The master control data storage 106 can contain computer instructions 512 configured to instruct the master control processor to measure movement of fluid in the tanks.

The master control data storage 106 can contain computer instructions 513 configured to instruct the master control processor and a remote processor to communicate a plurality of alarms with a plurality of client devices via a network, using the bidirectional signals.

The master control data storage can contain computer instructions 514 configured to instruct the master control processor and a remote processor to use inclinometer values to recalculate a location of each of the temperature sensors and each of the pressure transducers in the fluid and use the tank capacity table to determine accurate volume and mass of liquid and vapor of the fluid when a probe processor on the floating vessel fails and to redistribute inclinometer data to probe processors on the floating vessel.

The master control data storage can contain preset levels for fluids 515 and can contain alarm logs 516.

The master control data storage can contain computer instructions 524 configured to instruct at least one of: the master control processor and a remote processor to instruct the probe processors to configure and reconfigure online.

The master control data storage can contain computer instructions 528 configured to instruct the master control processor and a remote processor to compare measured ambient pressure and temperature to measured pressure and temperature inside the multiple tanks for gas blanket monitoring and asset protection of the tanks.

The master control data storage can contain computer instructions 529 configured to instruct the master control processor or a remote processor to communicate with at least one of the the probe processors, remote processor, and client devices, the measured data for emission calculations of the multiple tanks.

The master control data storage can contain computer instructions 531 configured to instruct at least one of: the master control processor and a remote processor to communicate with the probe processors the measured data for leak detection analysis.

The master control data storage can contain computer instructions 622 configured to instruct at least one of: the master control processor and remote processor to use a computed mass of the fluid for balancing during loading and unloading of a floating vessel and for inventory control and custody transfer.

The master control data storage can contain computer instructions 624 configured to instruct at least one of: the master control processor and remote processor to provide alarms for vapor emission parameters, leak detection, and unauthorized movement of fluid, which are at least one of a voice message, a text message, an email, a color message on a display, or an audible alarm.

The master control data storage can contain computer instructions 626 configured to instruct at least one of: the master control processor and remote processor to calculate at least one of: volumetric and mass balance of product, total fluid gain and loss in each of the multiple tanks, maintenance scheduling based on alarms actuated, and product quality control functions and benchmark product preparation based on density and density strata calculations of fluid in the multiple tanks.

The master control data storage can contain computer instructions 628 configured to instruct at least one of: the master control processor and a remote processor to calculate total emissions monitoring of the multiple tanks.

The master control data storage 106 can contain computer instructions 630 configured to instruct at least one of: the master control processor and a remote processor to provide reports in various formats including graphical or text screen reports, printed reports, file format for transfer or storage reports, or HTML formatted reports that can be read by any browser of a global communication network.

FIG. 8 shows the system with a plurality of tanks and a plurality of electronically connected probes on a floating vessel according to one or more embodiments.

In this embodiments, three probes 1a-1c can be mounted in tanks 8a and 8b

FIG. 8 shows an embodiment of the system for probes on floating vessels. Three probes 1a, 1b, and 1c can be mounted in tanks 8a and 8b of a floating vessel 7.

The floating vessel can be a ship, a barge, a workboat, a floating offshore platform, such as an FPSO or the like. In embodiment, the floating vessel can be a submerged buoy.

In embodiments, the probes can be mounted in parallel in a plurality of tanks on the floating vessel.

In embodiments, the probes can be mounted in parallel in a single tank whether on a floating vessel or on a land based tank.

Each probe can have a processor housing 20a, 20b, and 20c.

The inclinometer 32 is shown mounted to the floating vessel, which can communicate with each probe processor, which can be located in each of the processor housings.

In embodiments, the inclinometer 32 can provide measuring angles of the floating vessel relative to gravity for use by each probe processor.

Each probe processor can electrically and bi-directionally connect to each of the plurality of pressure transducers, the plurality of temperature sensors and the inclinometer of the system.

In embodiments, each processor housing can be weatherproof or explosion proof.

In embodiment, each of the processor housings can be configured to prevent degradation in marine environments.

While these embodiments have been described with emphasis on the embodiments, it should be understood that within the scope of the appended claims, the embodiments might be practiced other than as specifically described herein.

What is claimed is:

1. A system for continuous measurement of multiple fluids in multiple tanks and computation of physical properties for each of the multiple fluids continuously, the system comprising:
   a. a plurality of probes in communication with a network, each probe comprising:
      (i) a probe computer processor in communication with a probe data storage in a processor housing, wherein the probe computer processor comprises a temperature sensor simulation circuit with a temperature reference value in the probe data storage and a pressure transducer simulation circuit in the probe computer processor with a pressure reference value in the probe data storage, the temperature sensor simulation circuit and the pressure transducer simulation circuit for calibrating the probe computer processor for measuring temperature or pressure, and wherein the probe data storage comprises computer instructions to instruct the probe computer processor to perform adaptive measurement for at least one of: synchronized measurement of fluid in static operation and in dynamic operation and non-synchronized measurement of the fluid in static operation and dynamic operation;
      (ii) a plurality of pressure transducers electrically connected to the probe computer processor; and
      (iii) a plurality of temperature sensors electrically connected to the probe computer processor for measurement of the fluid in the tank;
   b. at least one client device in communication with the network;
   c. a master control computer processor in communication with the network and with a master control data storage, the master control data storage with a non-transitory computer readable medium containing computer instructions stored therein for causing the master control computer processor to:
      (i) instruct the master control computer processor to receive data from the plurality of probes;
      (ii) instruct the master control computer processor to receive data from other detection devices associated with the fluid in each tank;
      (iii) instruct the master control computer processor to map collected data to a relational database in the master control data storage;
      (iv) instruct the master control computer processor to compare the mapped collected data to stored values in the master control data storage, wherein each stored value is associated with an alarm function, each alarm function prioritized by safety considerations input by a user;
      (v) instruct the master control computer processor to generate and send alarms to a display connected to the master control computer processor and a plurality of client devices;
      (vi) instruct the master control computer processor to generate reports associated with the generated alarm, in a plurality of formats, simultaneously;
      (vii) instruct the master control computer processor to generate an alarm log; and
      (viii) instruct the master control computer processor to generate a history of actions taken by the user to any component or operating parameter of the system.

2. The system of claim 1, comprising at least one temperature and at least one pressure transducer located in a vapor space of each tank.

3. The system of claim 1, the master control data storage with the non-transitory computer readable medium containing the computer instructions stored therein for causing the master control computer processor to:
   a. instruct the master control computer processor to measure movement of liquid in the multiple tanks; and
   b. instruct at least one of: the master control computer processor and a remote processor to communicate a plurality of alarms with the plurality of client devices via the network using bidirectional signals.

4. The system of claim 3, further comprising an inclinometer mounted to a floating vessel or within the processor housing for measuring angles of the floating vessel relative to gravity and computer instructions in the master control data storage configured to instruct at least one of: the master control computer processor and the remote processor to use inclinometer values to recalculate a location of each of the temperature sensors and each of the pressure transducers in the fluid and use a tank capacity table to determine accurate volume and mass of the liquid and vapor of the fluid when the probe computer processor on the floating vessel fails, and to redistribute inclinometer data to the probe computer processor on the floating vessel.

5. The system of claim 3, wherein the master control data storage with the non-transitory computer readable medium comprising computer instructions configured to instruct at least one of: the master control computer processor and the remote processor to instruct the probe computer processor to configure and reconfigure online.

6. The system of claim 3, wherein the master control data storage with the non-transitory computer readable medium comprises computer instructions configured to instruct at least one of the master control computer processor or the remote processor to communicate the measured data for leak detection analysis with the probe computer processor.

7. The system of claim 3, wherein the master control data storage with the non-transitory computer readable medium comprises computer instructions configured to instruct at least one of the master control computer processor and the remote processor to use a computed mass of the fluid for balancing during loading and unloading of a floating vessel, and for inventory control and custody transfer.

8. The system of claim 3, wherein the master control data storage with the non-transitory computer readable medium comprises computer instructions configured to instruct at least one of the master control computer processor and the remote processor to provide alarms for vapor emission parameters, leak detection, and unauthorized movement of the fluid which are at least one of: a voice message, a text message, an email, a color message on a display, or an audible alarm.

9. The system of claim 3, wherein the master control data storage with the non-transitory computer readable medium comprises computer instructions configured to instruct at least one of the master control computer processor and the remote processor to calculate at least one of: a volumetric and mass balance of product, a total fluid gain and loss in each of the multiple tanks, a maintenance scheduling based on alarms actuated, and product quality control functions and benchmark product preparation based on density and density strata calculations of fluid in the multiple tanks.

10. The system of claim 3, wherein the master control data storage with the non-transitory computer readable medium comprises computer instructions configured to instruct at least one of: the master control computer processor and the remote processor to calculate total emissions of the multiple tanks.

11. The system of claim 3, wherein the master control data storage with the non-transitory computer readable medium comprises computer instructions configured to instruct at least one of: the master control computer processor and the remote processor to provide reports in various formats including graphical or text screen reports, printed reports, file format for transfer or storage reports, or HTML formatted reports that can be read by any browser.

12. The system of claim 1, wherein each probe comprises a plurality of switches, each switch providing a notification signal to at least one of: the probe computer processor, the master control computer processor, and the network when the fluid exceeds or fails to meet a preset level.

13. The system of claim 1, wherein each probe comprises a tank movement measuring device communicating with the master control computer processor, the probe computer processor, or a display for an operator, the tank movement measuring device measuring and displaying movement due to flexing of a floor of each tank or due to flexing of a roof of each tank, wherein the display is at least one of: a local display and a remote display.

14. The system of claim 1, wherein the master control data storage with the non-transitory computer readable medium comprising computer instructions configured to instruct the master control computer processor to calculate snow or water accumulation on a roof of each tank using the bidirectional signals from each probe, computer instructions configured to instruct the master control computer processor to calculate parameters necessary for emissions monitoring, computer instructions configured to instruct the master control computer processor to calculate parameters necessary for leak detection and unauthorized movement of the fluid into or out of each tank, computer instructions configured to instruct the master control computer processor to calculate parameters necessary for overfill protection of each tank, and computer instructions configured to instruct the master control computer processor to calculate tank overpressure or vacuum parameters in each tank.

15. The system of claim 1, comprising a remote processor and a remote data storage with a non-transitory computer readable medium containing computer instructions configured to instruct the remote processor to calculate snow or water accumulation on a roof of each tank using the bidirectional signals from each probe, computer instructions to instruct the remote processor to collect data from multiple probes and concentrate the data for communication to the master control computer processor, computer instructions configured to instruct the remote processor to calculate parameters necessary for emission monitoring, computer instructions configured to instruct the remote processor to calculate parameters necessary for leak detection and unauthorized movement of the fluid into or out of each tank, computer instructions configured to instruct the remote processor to calculate parameters necessary for overfill protection of each tank, and computer instructions configured to instruct the remote processor to calculate tank overpressure or vacuum parameters in each tank.

16. The system of claim 1, wherein each probe comprises an external sensor outside of at least one of the tanks and electrically connected to the master control computer processor, the external sensor configured to measure ambient pressure and ambient temperature outside of the at least one tank, the external sensor providing signals to at least one of: the master control computer processor and a remote processor, the master control computer processor using computer instructions in the master control data storage configured to instruct at least one of the master control computer processor or the remote processor to compare measured ambient pressure and temperature to measured pressure and temperature inside the multiple tanks for gas blanket monitoring and asset protection of the tanks.

17. The system of claim 16, wherein the master control data storage with a non-transitory computer readable medium comprises computer instructions configured to instruct the master control computer processor or the remote processor to communicate with at least one of the probe computer processor, the remote processor, and the at least one client device, the measured data for emission calculations of the multiple tanks.

18. The system of claim 1, further comprising at least one sulfur containing compound detector mounted in each tank in communication with least one of: the probe computer processor and the master control computer processor for detecting sulfur containing compounds in each tank.

* * * * *